United States Patent [19]

Shah et al.

[11] Patent Number: 4,666,484

[45] Date of Patent: May 19, 1987

[54] MULTI-STAGE FREEZE CONCENTRATING PROCESS AND APPARATUS

[75] Inventors: Tushar K. Shah, Joliet; Yuksel A. Selcukoglu, Naperville, both of Ill.

[73] Assignee: CBI Industries, Inc., Oak Brook, Ill.

[21] Appl. No.: 877,750

[22] Filed: Jun. 23, 1986

[51] Int. Cl.4 ............................ B01D 9/04; C02F 1/22
[52] U.S. Cl. ......................................... 62/532; 62/123
[58] Field of Search ................. 62/123, 532, 543, 544, 62/545

[56] References Cited

U.S. PATENT DOCUMENTS

| | | | |
|---|---|---|---|
| 3,248,890 | 5/1966 | Oman | 62/544 |
| 3,344,616 | 10/1967 | Owen | 62/532 |
| 3,442,801 | 5/1969 | Anderson | 62/123 |
| 3,605,426 | 9/1971 | Chao et al. | 62/123 |
| 3,817,051 | 6/1974 | Seliber | 62/123 |
| 4,091,635 | 5/1978 | Ogman | 62/123 |
| 4,286,436 | 9/1981 | Engdahl et al. | 62/123 |
| 4,457,769 | 7/1984 | Engdahl | 62/532 |

Primary Examiner—Ronald C. Capossela
Attorney, Agent, or Firm—Marshall, O'Toole, Gerstein, Murray & Bicknell

[57] ABSTRACT

Apparatus and methods are disclosed for concentrating aqueous liquids which increase in viscosity with concentration using three stages employing screw concentrators in series which separate ice crystals from the liquid.

16 Claims, 1 Drawing Figure

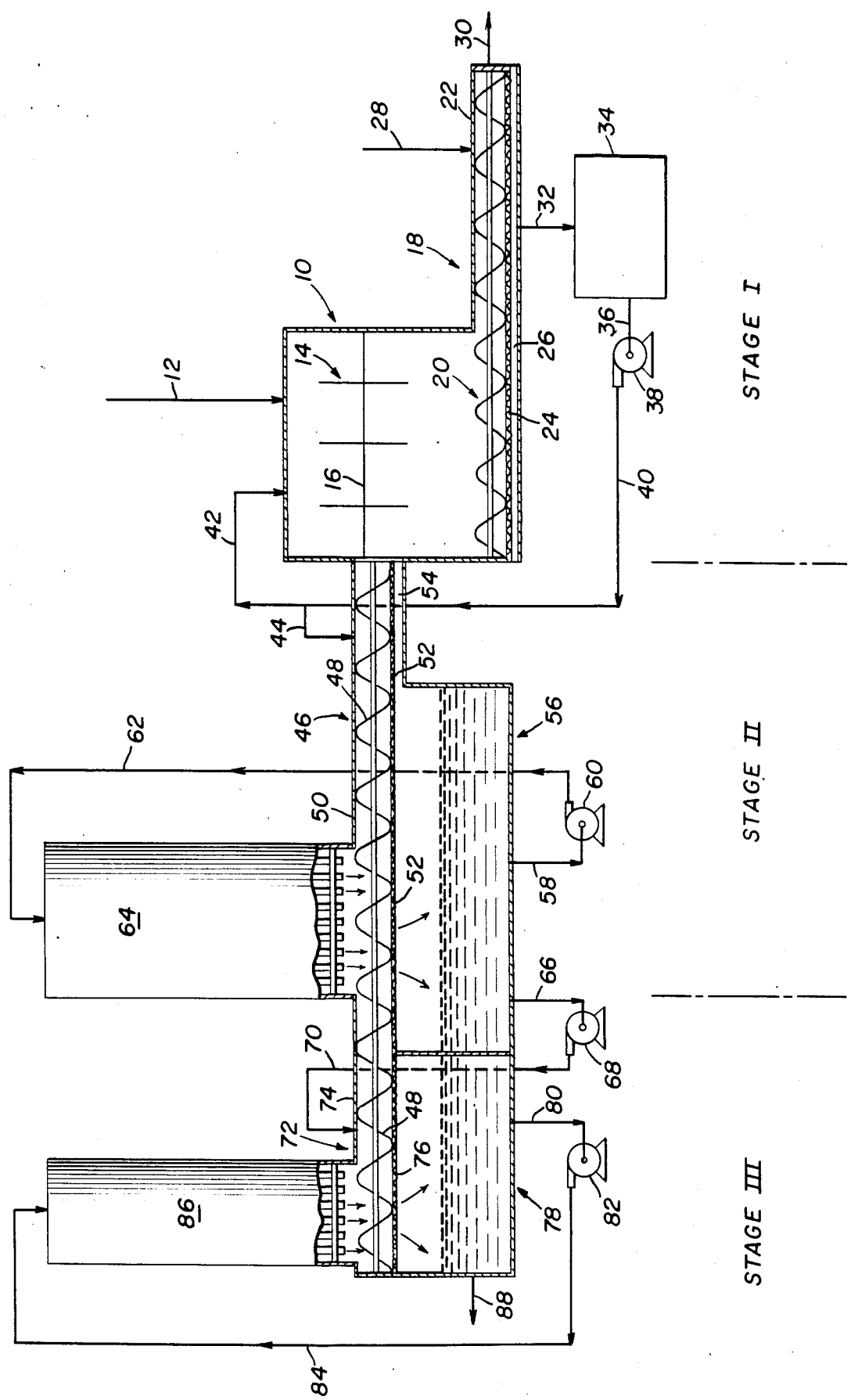

MULTI-STAGE FREEZE CONCENTRATING PROCESS AND APPARATUS

This invention relates to apparatus for, and methods of, concentrating an aqueous liquid which increases in viscosity with increase in concentration.

BACKGROUND OF THE INVENTION

It is often necessary, or at least desirable, to concentrate an aqueous liquid, such as a solution or mixture, by removing a portion of the solvent, generally water, from the aqueous liquid. The resulting product, therefore, is in a more concentrated form. Some such products which are concentrated by removal of water are fruit and vegetable juices including orange juice, grapefruit juice, lime juice, apple juice and grape juice; vegetable juices such as pineapple juice, tomato juice and cranberry juice; wine, alcoholic beverages such as beer and ale and non-alcoholic beverages such as coffee and tea.

Because of the shortcomings involved in evaporative concentration, it has been found advantageous to freeze concentrate many aqueous liquids, or products, such as those just described. In such a process, water is removed by first producing ice crystals which are then separated from the concentrate. Next, the ice crystals are washed to remove the concentrate remaining on them. The ice crystals can then be discarded or melted if potable water is desired.

It is recognized that the viscosity of products being freeze concentrated may substantially increase as water is removed, especially products containing dissolved sugars and suspended solids. Processing of products with increased viscosity requires substantial energy consumption since they are difficult to pump, and gravity flow is relatively slow. Also, it is difficult to recover a viscous concentrate from ice crystals by washing. When concentrating a product such as orange juice, even a small loss of entrained concentrate is quite detrimental economically. See C. Judson King, "Separation Processes", McGraw-Hill, page 725. Removal of the entrained concentrate from ice crystals by washing would be most effective with a low product viscosity and large ice crystals.

Abraham Ogman's U.S. Pat. No. 4,091,635 discloses an apparatus form and method of, freeze concentrating an already concentrated feed stream. Ogman employs a two stage system in which each stage uses a freezer-crystallizer and a washer. In the first stage, the concentration is doubled. Ice from the first stage is then brought to the second stage and diluted with a feed stream of low concentration following which the diluted solution is freeze concentrated in the second stage.

A two stage process has three important drawbacks when compared to a three stage process. First, final washing of ice crystals takes place at a relatively high viscosity, which results in inadequate washing of ice crystals. Second, most of the ice crystals may have to be produced at a high viscosity resulting in smaller ice crystals. Third, the energy consumption is very high.

Gerald E. Engdahl's U.S. Pat. No. 4,457,769 also discloses an apparatus for, and method of, freeze concentration. Engdahl is directed primarily to use of a crystallizer in which ice crystals can grow to thereby provide a slurry from which the liquid concentrate can be more readily separated and washed. It does, however, disclose use of two freeze exchangers in series and a conventional washer to separate concentrate from ice. While the Engdahl system constitutes an improvement over earlier systems, it requires more energy consumption to operate than desired. In addition, it involves problems in handling the more viscous concentrates which are desired commercially so that less water content need be shipped with the product concentrate.

Another drawback is that in such a system which is not totally enclosed, there is a large interface between the aqueous liquid and the surrounding atmosphere in each stage making it difficult to have an inert gas blanket over the aqueous liquid. This can affect the quality of the concentrate.

For the above reasons, a need exists for alternative apparatus and methods for concentrating aqueous liquids such as those previously described, which increase in viscosity with increase in concentration and where it is necessary to preserve highly volatile flavors and aromas in the concentrate.

SUMMARY OF THE INVENTION

According to the invention, a multi-stage process of concentrating an aqueous liquid, which increases in viscosity with increase in concentration, is provided comprising delivering an aqueous liquid feed stream to a crystallizer containing ice crystals and the aqueous liquid at a first level of increased concentration and viscosity higher than that of the feed stream; feeding a mixture of aqueous liquid and ice crystals from the crystallizer to a first screw concentrator in which aqueous liquid is separated from the ice; collecting the aqueous liquid from the first screw concentrator in a first receiver; withdrawing aqueous liquid from the first receiver and feeding a portion to the crystallizer and a portion to a second screw concentrator to wash aqueous liquid from ice crystals therein; collecting the aqueous liquid wash from the second screw concentrator in a second receiver; feeding aqueous liquid from the second receiver to a first freeze exchanger in which some of the liquid is converted to ice crystals; feeding the mixture of aqueous liquid and ice crystals from the first freeze exchanger to the second screw concentrator in which aqueous liquid is separated from the ice and then feeding the aqueous liquid from which ice is separated to the second receiver as an aqueous liquid at a second level of increased concentration and viscosity higher than that of liquid in the first receiver; withdrawing aqueous liquid from the second receiver and feeding it to a third screw concentrator to wash aqueous liquid from ice crystals therein; collecting the aqueous liquid wash from the third screw concentrator in a third receiver; feeding aqueous liquid from the third receiver to a second freeze exchanger in which some of the liquid is converted to ice crystals; feeding the mixture of aqueous liquid and ice crystals from the second freeze exchanger to the third screw concentrator in which aqueous liquid is separated from the ice and then feeding the aqueous liquid from which ice is separated to the third receiver as an aqueous liquid at a third level of increased concentration and viscosity higher than that of liquid in the second receiver; and removing a stream of concentrated aqueous liquid, from which ice is removed, from the third receiver.

The third screw concentrator can feed ice, after it is washed, to the second screw concentrator upstream of the first freeze exchanger. Also, the second screw concentrator can feed ice, after it is washed, to the crystallizer.

In a particularly useful arrangement, the second and third screw concentrators can be in substantially end-to-end alignment.

In practicing the method, it is desirable to have the aqueous liquid flow by gravity from the second freeze exchanger to the third screw concentrator and then to the third receiver. Also, it is desirable for the aqueous liquid to flow by gravity from the first freeze exchanger to the second screw concentrator and then to the second receiver.

The method is especially useful for concentrating aqueous liquids in the form of solutions and mixtures, such as fruit and vegetable juices, sugar solutions, wine, alcoholic beverages or non-alcoholic beverages, which increase in viscosity with concentration.

According to a further aspect of the invention, apparatus is provided for multi-stage concentrating an aqueous liquid which increases in viscosity with increase in concentration comprising a crystallizer; conduit means for delivering an aqueous liquid feed stream to the crystallizer which is adapted to contain ice crystals and aqueous liquid at a first level of increased concentration and viscosity higher than that of the feed stream; a first screw concentrator; conduit means for feeding a mixture of aqueous liquid and ice crystals from the crystallizer to the first screw concentrator in which aqueous liquid is separated from the ice; a first receiver; means for feeding aqueous liquid from the first screw concentrator to the first receiver; a second screw concentrator; means for withdrawing aqueous liquid from the first receiver, feeding a portion to the crystallizer and feeding a portion to a second screw concentrator to wash aqueous liquid from ice crystals therein; a second receiver; means for feeding aqueous liquid wash from the second screw concentrator to the second receiver; a first freeze exchanger; means for feeding aqueous liquid from the second receiver to the first freeze exchanger in which some of the liquid is converted to ice crystals; means for feeding a mixture of aqueous liquid and ice crystals from the first freeze exchanger to the second screw concentrator in which aqueous liquid can be separated from the ice and then feeding the aqueous liquid from which ice is separated to the second receiver as an aqueous liquid at a second level of increased concentration and viscosity higher than that of liquid in the first receiver; a third screw concentrator; conduit means for withdrawing aqueous liquid from the second receiver and feeding it to the third screw concentrator to wash aqueous liquid from ice crystals therein; a third receiver; means for feeding aqueous liquid wash from the third screw concentrator to the third receiver; a second freeze exchanger; conduit means for feeding aqueous liquid from the third receiver to the second freeze exchanger in which some of the liquid can be converted to ice crystals; means for feeding a mixture of aqueous liquid and ice crystals from the second freeze exchanger to the third screw concentrator in which aqueous liquid can be separated from the ice and then feeding the aqueous liquid from which ice is separated to the third receiver as an aqueous liquid at a third level of increased concentration and viscosity higher than that of liquid in the second receiver; and means for removing concentrated aqueous liquid, from which ice is removed, from the third receiver.

The apparatus can include means by which the third screw concentrator can feed ice, after washing, to the second screw concentrator upstream of the first freeze exchanger. Additionally, it can include means by which the second screw concentrator can feed ice, after washing, to the crystallizer.

The apparatus can also include means by which the aqueous liquid can flow by gravity from the second freeze exchanger to the third screw concentrator and then to the third receiver. Furthermore, means by which the aqueous liquid can flow by gravity from the first freeze exchanger to the second screw concentrator and then to the second receiver are desirably incorporated in the apparatus.

BRIEF DESCRIPTION OF THE DRAWING

The drawing illustrates, in side elevation, a multistage apparatus according to the invention for concentrating an aqueous liquid which increases in viscosity with concentration.

DETAILED DESCRIPTION OF THE DRAWING

The apparatus shown in the drawing includes a crystallizer 10 to which fresh aqueous feed liquid is supplied by conduit 12. A stirrer or mixer 14, mounted to rotate on horizontal shaft 16, is included in the crystallizer 10.

A first screw or auger concentrator 18 is horizontally and rotatably mounted so that a substantial portion of the screw 20 is located in the bottom of the crystallizer 10. The other portion of the screw 20 is located in a tube 22. Screen 24 is beneath and in contact with the lower part of screw 20. As screw 20 rotates, a mixture of ice crystals and liquid is propelled by the screw from left to right whereby the ice is compacted and the liquid squeezed out to flow through screen 24 into chamber 26. Conduit 28 communicates with screw 20 and supplies wash water to the compacted ice to wash off residual liquid which flows into chamber 26. Reject ice is expelled from tube 22 to conduit 30 for disposal or use as potable water.

Conduit 32 delivers the liquid from chamber 26 of the first screw concentrator 18 to the first receiver 34. The aqueous liquid in the crystallizer 10 and in the first receiver 34 is raised by removal of water in the form of ice to a first level of increased concentration and viscosity higher than that of the feed stream supplied by conduit 12.

Conduit 36 communicates with first receiver 34 and pump 38 and they are used to withdraw liquid from the receiver and feed it to conduit 40. Conduit 40 delivers part of the liquid to conduit 42, which returns it to crystallizer 10, and part of the liquid to second screw concentrator 46.

The second screw concentrator 46 includes a screw 48, partially in tube 50, and having a screen 52 along the lower portion of the screw. Liquid fed by conduit 44 flows through compressed or compacted ice in concentrator 46 and washes from the ice a more concentrated and viscous liquid. The combined liquids flow through screen 52 into chamber 54 from which the liquid flows into second receiver 56.

Liquid is removed from the second receiver 56 by conduit 58 which feeds it to pump 60. Pump 60 delivers the liquid to conduit 62 which feeds it to the top of a first shell and tube freeze exchanger 64, such as disclosed in Engdahl et al U.S. Pat. No. 4,286,436. As the liquid flows down the inside surface of the tubes as a falling film it is indirectly cooled by heat exchange to a refrigerant or other cold liquid on the shell side. Cooling of the falling film results in ice crystal formation. The resulting mixture of ice crystals and liquid flows on rotating screw 48. The liquid flows through screen 52 into second receiver 56 while the rotating screw propels the ice to the right and compacts it, thus expelling liquid which also flows into the second receiver 56. After being partially washed by liquid supplied to the screw by conduit 44, the ice is delivered by the screw to crystallizer 10.

As a result of the removal of water as ice in the manner just described, the aqueous liquid in second receiver 56 is at a second level of increased concentration and viscosity higher than that of liquid in the first receiver 34.

To further concentrate liquid in the second receiver 56, liquid is removed therefrom by conduit 66 and fed to pump 68 which feeds it to conduit 70. Conduit 70 delivers the liquid to third screw concentrator 72 having a tube 74 and also containing a portion of screw 48. Although the apparatus as described and illustrated in the drawing uses a single screw 48 which constitutes part of each of the second and third concentrators 46 and 72, it is within the scope of the invention to use two separate screws in alignment or not.

The liquid from conduit 70 flows through compacted ice being moved to the right by screw 48. The more viscous residual liquid in the ice is washed downwardly and flows through screen 76 into third receiver 78.

Liquid in the third receiver 78 is withdrawn through conduit 80 and fed to pump 82 from which it is delivered to conduit 84. Conduit 84 feeds the liquid to the top of the second shell and tube freeze exchanger 86, which can be identical or similar to freeze exchanger 64, but will be always smaller than the second stage freezer. The mixture of ice and liquid exiting from freeze exchanger 86 flows on screw 48 beneath it. The ice displaced to the right by the screw is compacted. The liquid squeezed from it flows through screen 76 into third receiver 78. The ice, after being washed by liquid from conduit 70 as already described, continues to be moved to the right by the screw. As it moves it is further washed by less concentrated and less viscous liquid which flows through the ice from freeze exchanger 64 and conduit 44 before the ice is fed to crystallizer 10.

By the formation and removal of additional ice as described, the aqueous liquid which accumulates in third receiver 78 is at a third level of increased concentration and viscosity higher than that of liquid in the second receiver. The liquid in third receiver 78, generally considered the final product, can be withdrawn from the third receiver 78 by conduit 88.

An apparatus as described and illustrated by the drawing can be operated at the following flow rates for a typical size pilot plant in the concentration of fresh orange juice:

| Drawing Element | Gallons per Minute |
| --- | --- |
| 12 | 26 |
| 30 | 20 |
| 32 | 112 |
| 42 | 74 |
| 44 | 38 |
| 62 | 528 |
| 70 | 17 |
| 84 | 306 |
| 88 | 6 |

This viscosity of the orange juice as it is concentrated is approximately as follows:

| Liquid (Drawing element) | °Brix |
| --- | --- |
| Fresh feed (12) | 12 |
| Crystallizer (10) | 18 |
| First receiver (56) | 30 |
| Second receiver (78) | 45 |

When a juice is concentrated using the apparatus, it is essentially a three stage operation. Each stage operates at optimum conditions, making the whole process highly efficient.

In the first stage, the ice is rejected where the liquid viscosity is lowest. This facilitates washing the ice crystals and minimizes juice loss.

In the second stage, more than 75% of the ice can be produced. Since the 30° B viscosity is not high, the ice crystals are larger and easier to separate and refrigeration costs are lower. The freezing point of 30° B juice is not low so that relatively high heat flux can be maintained. This reduces the cost of the first freeze exchanger.

In the third stage the 45° B viscosity of the juice is very high. However, the ice to be produced in this stage is much less than in the second stage. Also, the total amount of juice processed through the third stage is also much smaller so that the second freeze exchanger can be relatively small. It is also easy to control the product quality because of the smaller liquid volume involved in this stage.

Since screws are used both in the ice concentrators and to convey the ice through the stages, equipment and piping costs are reduced. The three stage system is almost totally enclosed, and out of contact with external environmental or ambient conditions, which makes it easier to keep the aqueous liquid under an inert gas blanket or atmosphere in order to preserve the aroma and flavors. Also, because there are few pumps, controls and other associated expenses are lowered.

The foregoing detailed description has been given for clearness of understanding only, and no unnecessary limitations should be understood therefrom, as modifications will be obvious to those skilled in the art.

What is claimed is:

1. A multi-stage process of concentrating an aqueous liquid which increases in viscosity with increase in concentration comprising:

delivering an aqueous liquid feed stream to a crystallizer containing ice crystals and aqueous liquid at a first level of increased concentration and viscosity higher than that of the feed stream;

feeding a mixture of aqueous liquid and ice crystals from the crystallizer to a first screw concentrator in which aqueous liquid is separated from the ice;

collecting the aqueous liquid from the first screw concentrator in a first receiver;

withdrawing aqueous liquid from the first receiver and feeding a portion to the crystallizer and a portion to a second screw concentrator to wash aqueous liquid from ice crystals therein;

collecting the aqueous liquid wash from the second screw concentrator in a second receiver;

feeding aqueous liquid from the second receiver to a first freeze exchanger in which some of the liquid is converted to ice crystals;

feeding the mixture of aqueous liquid and ice crystals from the first freeze exchanger to the second screw concentrator in which aqueous liquid is separated from the ice and then feeding the aqueous liquid from which ice is separated to the second receiver as an aqueous liquid at a second level of increased concentration and viscosity higher than that of liquid in the first receiver;

withdrawing aqueous liquid from the second receiver and feeding it to a third screw concentrator to wash aqueous liquid from ice crystals therein;

collecting the aqueous liquid wash from the third screw concentrator in a third receiver;

feeding aqueous liquid from the third receiver to a second freeze exchanger in which some of the liquid is converted to ice crystals;

feeding the mixture of aqueous liquid and ice crystals from the second freeze exchanger to the third screw concentrator in which aqueous liquid is separated from the ice and then feeding the aqueous liquid from which ice is separated to the third receiver as an aqueous liquid at a third level of increased concentration and viscosity higher than that of liquid in the second receiver; and removing a stream of concentrated aqueous liquid, from which ice is removed, from the third receiver.

2. A method according to claim 1 in which the third screw concentrator feeds ice, after washing, to the second screw concentrator upstream of the first freeze exchanger.

3. A method according to claim 1 in which the second screw concentrator feeds ice, after washing, to the crystallizer.

4. A method according to claim 1 in which the second and third screw concentrators are in substantially end-to-end alignment.

5. A method according to claim 1 in which the aqueous liquid flows by gravity from the second freeze exchanger to the third screw concentrator and then to the third receiver.

6. A method according to claim 1 in which the aqueous liquid flows by gravity from the first freeze exchanger to the second screw concentrator and then to the second receiver.

7. A method according to claim 1 in which the aqueous liquid is a fruit or vegetable juice, sugar solution, wine, alcoholic beverage or non-alcoholic beverage.

8. Apparatus for multi-stage concentrating an aqueous mixture which increases in viscosity with increase in concentration comprising:

a crystallizer;

conduit means for delivering an aqueous liquid mixture feed stream to the crystallizer which is adapted to contain ice crystals and aqueous liquid mixture at a first level of increased concentration and viscosity higher than that of the feed stream;

a first screw concentrator;

conduit means for feeding a mixture of aqueous liquid and ice crystals from the crystallizer to the first screw concentrator in which aqueous liquid is separated from the ice;

a first receiver;

means for feeding aqueous liquid from the first screw concentrator to the first receiver;

a second screw concentrator;

means for withdrawing aqueous liquid from the first receiver, feeding a portion to the crystallizer and feeding a portion to a second screw concentrator to wash aqueous liquid from ice crystals therein;

a second receiver;

means for feeding aqueous liquid wash from the second screw concentrator to the second receiver;

a first freeze exchanger;

means for feeding aqueous liquid from the second receiver to the first freeze exchanger in which some of the liquid is converted to ice crystals;

means for feeding a mixture of aqueous liquid and ice crystals from the first freeze exchanger to the second screw concentrator in which aqueous liquid can be separated from the ice and then feeding the aqueous liquid from which ice is separated to the second receiver as an aqueous liquid at a second level of increased concentration and viscosity higher than that of liquid in the first receiver;

a third screw concentrator;

conduit means for withdrawn aqueous liquid from the second receiver and feeding it to the third screw concentrator to wash aqueous liquid from ice crystals therein;

a third receiver;

means for feeding aqueous liquid wash from the third screw concentrator to the third receiver;

a second freeze exchanger;

conduit means for feeding aqueous liquid from the third receiver to the second freeze exchanger in which some of the liquid can be converted to ice crystals;

means for feeding a mixture of aqueous liquid and ice crystals from the second freeze exchanger to the third screw concentrator in which aqueous liquid can be separated from the ice and then feeding the aqueous liquid from which ice is separated to the third receiver as an aqueous liquid at a third level of increased concentration and viscosity higher than that of liquid in the second receiver; and means for removing concentrated aqueous liquid, from which ice is removed, from the third receiver.

9. Apparatus according to claim 8 including means by which the third screw concentrator can feed ice, after washing, to the second screw concentrator upstream of the first freeze exchanger.

10. Apparatus according to claim 8 including means by which the second screw concentrator can feed ice, after washing, to the crystallizer.

11. Apparatus according to claim 8 in which the second and third screw concentrators are in substantially end-to-end alignment.

12. Apparatus according to claim 8 including means by which the aqueous liquid can flow by gravity from the second freeze exchanger to the third screw concentrator and then to the third receiver.

13. Apparatus according to claim 8 including means by which the aqueous liquid can flow by gravity from the first freeze exchanger to the second screw concentrator and then to the second receiver.

14. Apparatus according to claim 8 adapted to concentrate a fruit or vegetable juice, sugar solution, wine, alcoholic beverage or non-alcoholic beverage.

15. Apparatus according to claim 1 in which the aqueous liquid is enclosed in the apparatus during concentration and is out of contact with environmental conditions external of the apparatus.

16. Apparatus according to claim 15 in which an inert gas blanket protects aqueous liquid in the apparatus.

* * * * *

UNITED STATES PATENT AND TRADEMARK OFFICE
CERTIFICATE OF CORRECTION

PATENT NO. : 4,666,484

DATED : May 19, 1987

INVENTOR(S) : Tushar K. Shah et al

It is certified that error appears in the above-identified patent and that said Letters Patent is hereby corrected as shown below:

Column 1, line 47, change "form" to -- for --; column 8, line 60, change "claim 1" to -- claim 8 --.

Signed and Sealed this

Fifteenth Day of September, 1987

Attest:

DONALD J. QUIGG

Attesting Officer     Commissioner of Patents and Trademarks